(12) United States Patent
Sun et al.

(10) Patent No.: US 10,823,543 B2
(45) Date of Patent: Nov. 3, 2020

(54) SAMPLE GAUGE LENGTH AND LENGTH AFTER FRACTURE MEASURING DEVICE

(71) Applicant: CITIC Dicastal CO., LTD., Hebei (CN)

(72) Inventors: Hanbao Sun, Qinhuangdao (CN); Jinqi Lv, Qinhuangdao (CN); Yingwei Zhu, Qinhuangdao (CN); Jingying Liu, Qinhuangdao (CN); Yingfeng Wang, Qinhuangdao (CN); Zhuxing Wang, Qinhuangdao (CN); Zhihua Zhu, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 179 days.

(21) Appl. No.: 16/258,798

(22) Filed: Jan. 28, 2019

(65) Prior Publication Data

US 2019/0390946 A1 Dec. 26, 2019

(30) Foreign Application Priority Data

Jun. 26, 2018 (CN) .......................... 2018 1 0666525

(51) Int. Cl.
*G01B 5/02* (2006.01)
*G01B 5/04* (2006.01)
*G01N 3/04* (2006.01)
*G01N 3/06* (2006.01)

(52) U.S. Cl.
CPC .............. *G01B 5/043* (2013.01); *G01N 3/04* (2013.01); *G01N 3/06* (2013.01); *G01N 2203/0067* (2013.01)

(58) Field of Classification Search
CPC ............. G01B 5/043; G01N 3/04; G01N 3/06
USPC ........................... 33/813, 819, 823, 828, 837
See application file for complete search history.

(56) References Cited

U.S. PATENT DOCUMENTS

| | | | | |
|---|---|---|---|---|
| 3,810,310 A | * | 5/1974 | Morgan | G01B 3/18 33/816 |
| 5,345,692 A | * | 9/1994 | Babitchenko | G01B 3/18 33/826 |
| 6,286,227 B1 | * | 9/2001 | Corby, Jr. | G01B 3/18 33/813 |

(Continued)

FOREIGN PATENT DOCUMENTS

| CN | 1542399 A | 11/2004 |
|---|---|---|
| CN | 201429389 Y | 3/2010 |

(Continued)

OTHER PUBLICATIONS

"Metallic materials—Tensile testing at ambient temperature", Apr. 2003, Part A: Physical Testing, vol. 39, No. 4, 11 pgs.

*Primary Examiner* — George B Bennett
(74) *Attorney, Agent, or Firm* — Cooper Legal Group, LLC

(57) ABSTRACT

A sample gauge length and length after fracture measuring device includes a worktable, a first sliding table support and a second sliding table support, a control and length display, a spiral micrometer head, a scriber, a sample, etc. The reading device using the spiral micrometer head to directly measure the gauge length and the length after fracture has a detection accuracy of ±0.01 mm, which is superior to the requirement of ±0.05 mm in GB/T228 Metallic Materials Tensile Testing at Ambient Temperature.

2 Claims, 3 Drawing Sheets

(56) References Cited

U.S. PATENT DOCUMENTS

| | | | | |
|---|---|---|---|---|
| 7,841,102 B2 * | 11/2010 | Xiao | ............... | G01B 3/22 33/832 |
| 2007/0271807 A1 * | 11/2007 | Karwowski | ............ | G01B 3/18 33/828 |
| 2013/0091720 A1 * | 4/2013 | Hayashida | ............ | G01B 3/18 33/819 |
| 2013/0276319 A1 * | 10/2013 | Tsuji | ............... | G01B 3/18 33/819 |
| 2015/0219431 A1 * | 8/2015 | Jordil | ............... | G01B 3/18 33/701 |
| 2019/0265135 A1 * | 8/2019 | Jeong | ............... | G01N 3/08 |

FOREIGN PATENT DOCUMENTS

| | | |
|---|---|---|
| CN | 101710111 A | 5/2010 |
| CN | 101829823 A | 9/2010 |
| CN | 201800034 U | 4/2011 |
| CN | 202512017 U | 10/2012 |
| CN | 103335851 A | 10/2013 |
| CN | 104416560 B | 8/2016 |
| CN | 106353182 A | 1/2017 |
| CN | 206113811 U | 4/2017 |

\* cited by examiner

SAMPLE GAUGE LENGTH AND LENGTH AFTER FRACTURE MEASURING DEVICE

CROSS-REFERENCE TO RELATED APPLICATIONS

The present application claims benefit of Chinese Application No. 201810666525.7, filed on Jun. 26, 2018, the contents of which are hereby incorporated by reference in its entirety.

BACKGROUND

The sample gauge length and length after fracture measuring device is a measuring device special for measuring the gauge length and length after fracture of a material test sample, and belongs to the technical field of material test and length measurement. Generally, the gauge length and length after fracture of the material test sample are measured with a special extensometer or vernier caliper.

The scribing of the sample gauge length needs manual measurement and scribing, and is almost completed manually, but the manual scribing of the gauge length is affected by the operator's proficiency, and large random errors are easily generated. The length after fracture of the sample is mostly measured with an extensometer or a vernier caliper. When the special extensometer is used, it has the following problems: on the one hand, the extensometer cannot be detached or moved; on the other hand, the length after fracture of the sample needs to be remeasured manually in most cases to verify the measuring accuracy of the extensometer; and when the material test comparison is performed between different laboratories, the length after fracture of the sample still needs to be measured manually.

The manual scribing of the gauge length and the detection of the length after fracture of the sample are mostly performed by the vernier caliper, or by a special device, such as Gauge length Device with announcement number CN206113811U, and Scribing Method for High-Speed Tensile Sample Gauge Length with announcement number CN 104416560 B. Most of the above patent documents only provide a gauge length scribing device and method, which cannot simultaneously scribe the gauge length and measure the length after fracture.

SUMMARY

The present disclosure relates to a sample gauge length and length after fracture measuring device, which is used for measuring the gauge length and length after fracture of a material test sample, and belongs to the technical field of material test and length measurement.

Accordingly, the objective of the present disclosure is to provide a sample gauge length and length after fracture measuring device capable of simultaneously meeting the requirements of the sample gauge length and length after fracture measurement; and at the same time, the present disclosure is intended to provide a sample gauge length and length after fracture measurement method which is convenient to operate and high in efficiency.

A sample gauge length and length after fracture measuring device includes a worktable, a first sliding table support, a control and length display, a spiral micrometer head, a scriber and a sample. The sample is installed between the first sliding table support and a second sliding table support; the spiral micrometer head is installed on the first sliding table support and located directly above the sample, and the axis of the sample is parallel to the axis of the spiral micrometer head in the vertical plane and parallel to the surface of the worktable.

The reading device using the spiral micrometer head to measure the gauge length and the length after fracture has a detection accuracy of ±0.01 mm, which is superior to the requirement of ±0.05 mm in GB/T228 Metallic Materials Tensile Testing at Ambient Temperature.

The spiral micrometer head is driven by a step motor, so manual measurement is not needed and random errors are reduced.

The control and length display contains an algorithmic correspondence between the rotation angle of the step motor and the axial length of the spiral micrometer head and can be used for accurate calculation and reading, and the reading variation of the spiral micrometer head is consistent with the reading of the length display.

The worktable serves as a base of the measuring device and is provided with a trapezoidal groove, and the first sliding table support and the second sliding table support are installed on the worktable.

The portion of the first sliding table support in contact with the worktable is a trapezoidal boss to facilitate movement and fixing on the worktable; the top of the first sliding table support is provided with a rectangular groove and a through hole, and a threaded hole is formed at the rectangular groove to facilitate the installation of a fastening bolt for fastening the spiral micrometer head; a rectangular groove, a rectangular notch and a through hole are formed in the middle of the first sliding table support, a threaded hole is formed at the rectangular groove, and the fastening bolt can be installed through the notch to fasten one end of the sample.

The portion of the second sliding table support in contact with the worktable is a trapezoidal boss to facilitate movement and fixing on the worktable; the top of the second sliding table support is provided with a rectangular groove and a through hole, and a threaded hole is formed at the rectangular groove to facilitate the installation of a fastening bolt for fastening the other end of the sample.

The scriber is installed at one end of the spiral micrometer head, and the end of the spiral micrometer head provided with the scriber is provided with a trapezoidal groove to facilitate the movement and positioning of the scriber.

The scriber is made of tool steel; the portion where the scriber is installed to the spiral micrometer head is provided with a trapezoidal boss and a threaded through hole to facilitate the fixing between the scriber and the spiral micrometer head; meanwhile, the end of the scriber in contact with the sample is machined into a line contact shape for reducing the scribing width of the sample.

A detection method for sample gauge length measurement includes the steps of:

1) installing one end of the sample in the through hole of the first sliding table support, and installing the other end of the sample in the through hole of the second sliding table support; adjusting the first sliding table support and the second sliding table support such that the fracture of the sample after fracture is closed to the smallest amount of clearance;

2) moving the scriber installed on the spiral micrometer head to contact the sample and scribe a first line mark of the gauge length; moving the scriber installed on the spiral micrometer head to align with the gauge length line mark of the sample after fracture; and 3) driving the scriber on the spiral micrometer head through the control and length display installed on the first sliding table support to move 25 mm gauge length toward the first sliding table support, moving the scriber to scribe a second line mark of the gauge length, simultaneously recording the length display value on the control and length display and the reading on the spiral micrometer head to ensure that the reading of the spiral micrometer head and the length display reading of the control and length display are within 0.01 mm, and taking the average value of the two reading values as the length after fracture of the sample.

The reading of the spiral micrometer head and the angle-length relationship reading of the step motor are jointly used as the gauge length and length after fracture of the sample to ensure that the values are accurate and reliable. The use of the step motor as a driving device for the spiral micrometer head can reduce random errors caused by personnel operations. The worktable with trapezoidal grooves facilitates the installation and movement of the first sliding table support and the second sliding table support such that the first sliding table support and the second sliding table support can move relative to each other on the worktable. The ends of the first sliding table support and the second sliding table support in contact with the worktable are made into trapezoidal bosses to facilitate the installation and movement of the first sliding table support and the second sliding table support on the worktable. One end of the spiral micrometer head is made into a trapezoidal groove to facilitate the movement of the scriber. The end of the scriber assembled with the spiral micrometer head is made into a trapezoidal boss to facilitate the movement in the trapezoidal groove of the spiral micrometer head.

BRIEF DESCRIPTION OF DRAWINGS

The embodiments of the present disclosure will be described in detail below in combination with the accompanying drawings.

Figure 1:
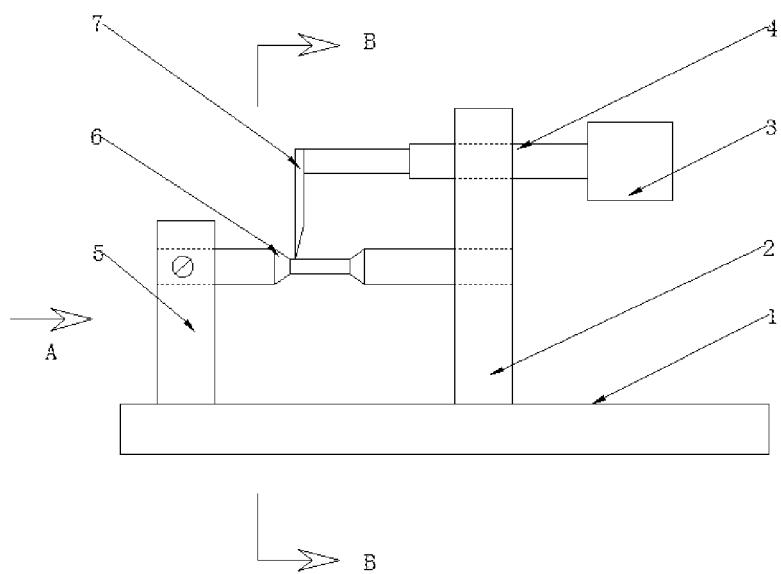
FIG. 1 is a structure diagram of a sample gauge length and length after fracture measuring device.
Figure 2:
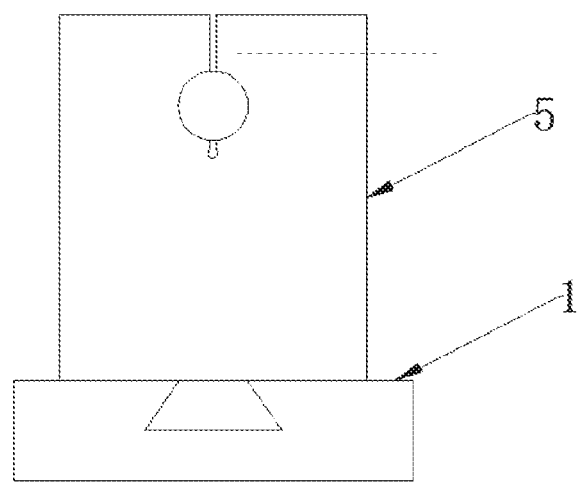
FIG. 2 is a schematic diagram of the sample gauge length and length after fracture measuring device in the A direction.
Figure 3:
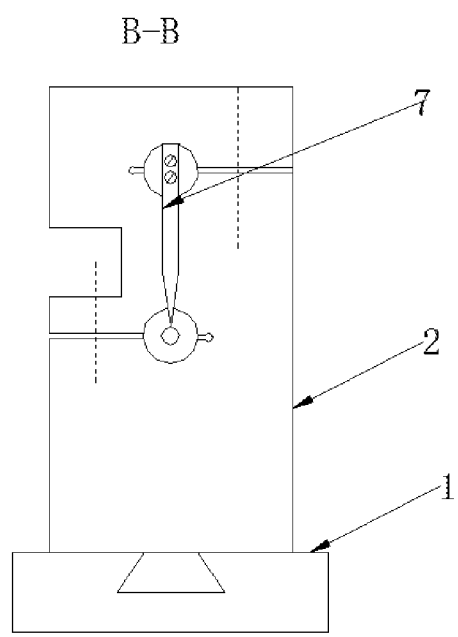
FIG. 3 is a B-B schematic diagram of the sample gauge length and length after fracture measuring device.

LIST OF REFERENCE SYMBOLS 1 worktable
2 first sliding table support
3 control and length display
4 spiral micrometer head
5 second sliding table support
6 sample
7 scriber

DETAILED DESCRIPTION

A sample gauge length and length after fracture measuring device includes a worktable, a first sliding table support, a control and length display, a spiral micrometer head, a scriber and a sample. The sample is installed between the first sliding table support and a second sliding table support; the spiral micrometer head is installed on the first sliding table support and located directly above the sample, and the axis of the sample is parallel to the axis of the spiral micrometer head in the vertical plane and parallel to the surface of the worktable.

The reading device using the spiral micrometer head to measure the gauge length and the length after fracture has a detection accuracy of ±0.01 mm, which is superior to the requirement of ±0.05 mm in GB/T228 Metallic Materials Tensile Testing at Ambient Temperature.

The spiral micrometer head is driven by a step motor, so manual measurement is not needed and random errors are reduced.

The control and length display contains an algorithmic correspondence between the rotation angle of the step motor and the axial length of the spiral micrometer head and can be used for accurate calculation and reading, and the reading variation of the spiral micrometer head is consistent with the reading of the length display.

The worktable serves as a base of the measuring device and is provided with a trapezoidal groove, and the first sliding table support and the second sliding table support are installed on the worktable.

The portion of the first sliding table support in contact with the worktable is a trapezoidal boss to facilitate movement and fixing on the worktable; the top of the first sliding table support is provided with a rectangular groove and a through hole, and a threaded hole is formed at the rectangular groove to facilitate the installation of a fastening bolt for fastening the spiral micrometer head; a rectangular groove, a rectangular notch and a through hole are formed in the middle of the first sliding table support, a threaded hole is formed at the rectangular groove, and the fastening bolt can be installed through the notch to fasten one end of the sample.

The portion of the second sliding table support in contact with the worktable is a trapezoidal boss to facilitate movement and fixing on the worktable; the top of the second sliding table support is provided with a rectangular groove and a through hole, and a threaded hole is formed at the rectangular groove to facilitate the installation of a fastening bolt for fastening the other end of the sample.

The scriber is installed at one end of the spiral micrometer head, and the end of the spiral micrometer head provided with the scriber is provided with a trapezoidal groove to facilitate the movement and positioning of the scriber.

The scriber is made of tool steel; the portion where the scriber is installed to the spiral micrometer head is provided with a trapezoidal boss and a threaded through hole to facilitate the fixing between the scriber and the spiral micrometer head; meanwhile, the end of the scriber in contact with the sample is machined into a line contact shape for reducing the scribing width of the sample.

As described in Embodiment 1, when the sample gauge length and length after fracture measuring device is used to detect 100 samples after fracture, the detection speed is twice as fast as that by a vernier caliper; and the detection accuracy is improved by 10% compared with that by a vernier caliper.

It can be easily learned by a person skilled in the art that the detection accuracy of sample gauge length and length after fracture measurement depends on two aspects, one is the scribing of a gauge length line, and the other is the measurement of the gauge length or the length of the sample after fracture. The combination of the above test devices can simultaneously meet the requirements of the sample gauge length and length after fracture measurement and the measurement accuracy.

The invention claimed is:

1. A sample gauge length and length after fracture measuring device, comprising a worktable, a first sliding table support, a control and length display, a spiral micrometer head, a second sliding table support, a sample and a scriber, wherein the sample is installed between the first sliding table support and the second sliding table support; the spiral micrometer head is installed on the first sliding table support and located directly above the sample, and an axis of the sample is parallel to an axis of the spiral micrometer head in a vertical plane and parallel to a surface of the worktable.

2. The sample gauge length and length after fracture measuring device according to claim 1, wherein the worktable is provided with a trapezoidal groove, and the first sliding table support and the second sliding table support are installed on the worktable;

- a portion of the first sliding table support in contact with the worktable is a trapezoidal boss; a top of the first sliding table support is provided with a rectangular groove and a through hole, and a threaded hole is formed at the rectangular groove to fasten the spiral micrometer head; a rectangular groove, a rectangular notch and a through hole are formed in a middle of the first sliding table support, a threaded hole is formed at the rectangular groove, and a fastening bolt can be installed through the notch to fasten one end of the sample;
- a portion of the second sliding table support in contact with the worktable is a trapezoidal boss to facilitate movement and fixing on the worktable; a top of the second sliding table support is provided with a rectangular groove and a through hole, and a threaded hole is formed at the rectangular groove to facilitate the installation of a fastening bolt for fastening other end of the sample;
- the scriber is installed at one end of the spiral micrometer head, and the end of the spiral micrometer head provided with the scriber is provided with a trapezoidal groove to facilitate movement and positioning of the scriber;
- the scriber is made of tool steel; a portion where the scriber is installed to the spiral micrometer head is provided with a trapezoidal boss and a threaded through hole to facilitate fixing between the scriber and the spiral micrometer head; meanwhile, an end of the scriber in contact with the sample is machined into a line contact shape for reducing the scribing width of the sample.

* * * * *